(12) United States Patent
Wang et al.

(10) Patent No.: US 12,503,738 B2
(45) Date of Patent: Dec. 23, 2025

(54) HOT-ROLLED, LOW-TEMPERATURE-RESISTANT, H-SHAPED STEEL WITH GRADE OF YIELD STRENGTH OF 420 MPa AND PREPARATION METHOD THEREFOR

(71) Applicant: SHANDONG IRON AND STEEL COMPANY LTD., Laiwu (CN)

(72) Inventors: Zhongxue Wang, Jinan (CN); Peilin Zhao, Jinan (CN); Hongyin Liu, Jinan (CN)

(73) Assignee: SHANDONG IRON AND STEEL COMPANY LTD., Laiwu (CN)

( * ) Notice: Subject to any disclaimer, the term of this patent is extended or adjusted under 35 U.S.C. 154(b) by 0 days.

(21) Appl. No.: 18/290,722

(22) PCT Filed: Sep. 16, 2021

(86) PCT No.: PCT/CN2021/118771
§ 371 (c)(1),
(2) Date: Jul. 10, 2025

(87) PCT Pub. No.: WO2023/000479
PCT Pub. Date: Jan. 26, 2023

(65) Prior Publication Data
US 2025/0092480 A1    Mar. 20, 2025

(30) Foreign Application Priority Data
Jul. 20, 2021    (CN) .......................... 202110818559.5

(51) Int. Cl.
*C22C 38/00*     (2006.01)
*B22D 11/00*     (2006.01)
(Continued)

(52) U.S. Cl.
CPC .......... *C21C 7/0645* (2013.01); *B22D 11/001* (2013.01); *C21C 7/0075* (2013.01);
(Continued)

(58) Field of Classification Search
CPC ..... C22C 38/001; C22C 38/002; C22C 38/02; C22C 38/04; C22C 38/06; C22C 38/24; C22C 38/28
(Continued)

(56) References Cited

U.S. PATENT DOCUMENTS 6,007,644 A * 12/1999 Ohmori .................. C22C 38/14
148/333
2019/0184436 A1 * 6/2019 Ito .......................... C22C 38/00
(Continued)

FOREIGN PATENT DOCUMENTS

CN     103266279 A     8/2013
CN     105018861 A     11/2015
(Continued)

OTHER PUBLICATIONS

Kimura, JP 2004269905 A Google Patents Machine and Images translation, printed May 13, 2025), Sep. 30, 2004, entire translation (Year: 2004).*
(Continued)

*Primary Examiner* — Katherine A Christy
(74) *Attorney, Agent, or Firm* — Flener IP & Business Law

(57) ABSTRACT

A hot-rolled, low-temperature-resistant, H-shaped steel with a grade of 420 MPa includes the following chemical components in percentages by weight: C: 0.08-0.10%, Si≤0.2%, Mn: 1.25-1.45%, V: 0.03-0.045%, Ti: 0.015-0.025%, Cr: 0.15-0.30%, Al: 0.02-0.04%, N: 0.007-0.01%, P≤0.008%, S≤0.005%, O≤0.004%, and the balance being Fe and inevitable impurities. Its manufacturing adopts the characteristic
(Continued)

of the flange of the small-specification H-shaped steel being thin in rectangular blank rolling, uses the design of a low C content suitable for normalizing rolling combined with a V micro-alloyed component, and adds an appropriate amount of Cr to control the cooling rate. The method avoids abnormal structures such as widmanstatten, which would reduce steel's low-temperature impact toughness, and results in a stably controlled, high-strength and high-toughness, hot-rolled, H-shaped steel with a grade of 420 MPa or more obtained on a hot-rolled H-shaped steel rolling mill.

1 Claim, 2 Drawing Sheets

(51) Int. Cl.
| | | |
|---|---|---|
| | *C21C 7/00* | (2006.01) |
| | *C21C 7/064* | (2006.01) |
| | *C21C 7/068* | (2006.01) |
| | *C21C 7/072* | (2006.01) |
| | *C21C 7/10* | (2006.01) |
| | *C21D 1/84* | (2006.01) |
| | *C21D 6/00* | (2006.01) |
| | *C21D 8/00* | (2006.01) |
| | *C21D 9/00* | (2006.01) |
| | *C22C 38/02* | (2006.01) |
| | *C22C 38/04* | (2006.01) |
| | *C22C 38/06* | (2006.01) |
| | *C22C 38/24* | (2006.01) |
| | *C22C 38/28* | (2006.01) |

(52) U.S. Cl.
CPC .............. *C21C 7/068* (2013.01); *C21C 7/072* (2013.01); *C21C 7/10* (2013.01); *C21D 1/84* (2013.01); *C21D 6/002* (2013.01); *C21D 6/005* (2013.01); *C21D 6/008* (2013.01); *C21D 8/005* (2013.01); *C21D 9/0068* (2013.01); *C22C 38/001* (2013.01); *C22C 38/002* (2013.01); *C22C 38/02* (2013.01); *C22C 38/04* (2013.01); *C22C 38/06* (2013.01); *C22C 38/24* (2013.01); *C22C 38/28* (2013.01)

(58) Field of Classification Search
USPC ........................................................ 428/587
See application file for complete search history.

(56) References Cited

U.S. PATENT DOCUMENTS

| | | | |
|---|---|---|---|
| 2019/0203309 A1* | 7/2019 | Mizoguchi | .............. C22C 38/42 |
| 2021/0140024 A1* | 5/2021 | Mizoguchi | .............. C22C 38/54 |

FOREIGN PATENT DOCUMENTS

| | | | |
|---|---|---|---|
| CN | 108893675 | A | 11/2018 |
| CN | 110205542 | A | 9/2019 |
| CN | 112522601 | A | 3/2021 |
| JP | 2003268498 | A | 9/2003 |
| JP | 2004010976 | A | 1/2004 |
| JP | 2004269905 | A | 9/2004 |
| JP | 2017071827 | A | 4/2017 |
| WO | 2023000479 | A1 | 1/2023 |

OTHER PUBLICATIONS

International Search Report for PCT/CN2021/118771; issued Apr. 7, 2022.

* cited by examiner

HOT-ROLLED, LOW-TEMPERATURE-RESISTANT, H-SHAPED STEEL WITH GRADE OF YIELD STRENGTH OF 420 MPa AND PREPARATION METHOD THEREFOR

CROSS-REFERENCE TO RELATED APPLICATIONS

This application claims priority to Chinese Patent Application No. 202110818559.5, filed on Jul. 20, 2021, which is incorporated herein by reference in its entirety.

TECHNICAL FIELD

The present invention belongs to the field of metallurgy technologies. Specifically, the present invention relates to a hot-rolled, low-temperature-resistant, H-shaped steel with a grade of 420 MPa and a preparation method therefor.

BACKGROUND

As energy extraction develops toward complex regions such as extremely-cold regions, there is an urgent need for a hot-rolled, H-shaped steel with higher comprehensive performance in place of a current low grade H-shaped steel, so that while a weight is reduced, higher reliability is ensured. In addition, to adapt to service environments in complex regions such as extremely-cold regions, higher requirements are raised for low-temperature impact toughness, welding performance, lamellar tearing resistance performance, and the like of steel products, and the demand for hot-rolled, H-shaped steels with higher grades of strength gradually increases.

Currently, enterprises producing hot-rolled, H-shaped steels in China have successively developed H-shaped steels of different grades of yield strengths of 345 MPa and more, and generally use composite micro-alloying in cooperation with a hot-rolling method for production. Different enterprises have prepared products with different grades and different comprehensive performance according to equipment levels.

Patent Application CN201510498771.2 discloses a hot-rolled, H-shaped steel with a grade of 420 MPa and excellent low-temperature toughness and a production method therefor. The steel includes the following components: C: 0.06-0.12%, Si: 0.20-0.40%, Mn: 1.20-1.60%, P≤0.015%, S≤0.010%, V: 0.050-0.070%, Ni: 0.10-0.20%, N: 0.0050-0.0100%, and the balance being Fe and inevitable impurities. Compared with existing technologies, in the patent, a hot-rolled, H-shaped steel with excellent comprehensive performance and 420 MPa is developed by appropriately designing the components V, Ni, and N and matching an adaptive rolling control and cooling control process. A yield strength ReH is 440-520 MPa, a tensile strength Rm is 550-650 MPa, an elongation A is A≥22%, and low-temperature impact toughness at −40° C. is KV2≥100 J. A two-phase mode is used for the cooling control in the patent: quick cooling in a first phase+air cooling in a second phase, and a special cooling apparatus is required to meet the foregoing preparation requirements. The produced hot-rolled, H-shaped steel with a grade of 420 MPa and excellent low-temperature toughness has thickness direction performance Z of 40-65%, and is a process design for beam blank-large specification products, but is not suitable for preparation of medium and small-specification, thin-flange, H-shaped steel products.

Patent Application CN201510788520.8 discloses a high-strength, low-yield-strength ratio, H-shaped steel with a grade of 420 MPa and a preparation method therefor. The H-shaped steel includes the following chemical components in percentages by weight: C: 0.11-0.15%, Si: 0.20-0.35%, Mn: 1.35-1.50%, P≤0.035%, S≤0.025%, Cu: 0.25-0.30%, Cr: 0.40-0.45, Ni: 0.20-0.30%, Nb: 0.20-0.30%, and the balance being iron and micro amount impurities. In the patent, the production of a low-yield-strength ratio, H-shaped steel with a grade of 420 MPa is implemented by optimizing a design of components. A yield strength is greater than 427 MPa, a tensile strength is greater than 641 MPa, and a yield-strength ratio is 0.64-0.67. In the patent, elements such as Ni, Nb, and Cu are added, and the steel is used for a specific high-corrosion-resistance environment. In a preparation process, under the impact of Cu, a probability of a fracture at a leg portion of an H-shaped steel under a high final rolling temperature condition is increased, and in addition, preparation costs are significantly increased.

Patent Application CN201510498771.2 discloses a high-performance, anti-seismic, H-shaped steel with a grade of 420 MPa and a preparation method therefor. The steel includes the following in percentage by weight: C: 0.15-0.18 wt %, Si: 0.30-0.45 wt %, Mn: 1.35-1.55 wt %, V: 0.070-0.090 wt %, P≤0.015 wt %, S≤0.020 wt %, and the balance being Fe and inevitable impurities. The preparation method includes molten steel smelting, deoxidation alloying, molten steel LF furnace refining, molten steel casting, and post-treatment steps. In the patent, a vanadium-nitrogen-rich micro-alloying process is used for smelting. Austenite grains are effectively refined. A nitrogen content is increased during smelting, so that vanadium carbonitrides are formed and are dispersed and distributed at grain boundaries, to facilitate austenite grain nucleation to further refine austenite grains. Through rolling, cooling control, quick cooling, and other processes, excellent appearance and surface quality of the H-shaped steel are ensured, and the performance of the steel is increased. The patent has obtained a strength index up to 420 MPa, but has not significantly improved low-temperature toughness.

In all the foregoing three H-shaped steels with a grade of 420 MPa and preparation technologies therefor, micro-alloying is used in cooperation with different cooling manners. The related products have large specifications and high strength, in addition have ensured certain impact toughness, and have high requirements of cooling equipment. In another aspect, common equipment is used for rolling, and requirements of low-temperature toughness are low. Therefore, for medium and small-specification, H-shaped steel products, the steel needs to be redesigned to further increase impact toughness while strength is improved under a high-temperature normalizing rolling condition. In addition, different from plate rolling, the H-shaped steel has more stringent requirements of a process because of a complex cross-section.

A dephosphorization stage in a current steelmaking procedure is usually completed in a converter. However, a single converter has a low dephosphorization rate, and it is very difficult to stably control a phosphorus content in molten steel below 0.01%. To increase a dephosphorization rate, in current disclosed existing technologies, two converters are usually used to perform deep dephosphorization by using a duplex process, so that a phosphorus content in molten steel can be stably controlled below 0.01%. However, because the duplex process needs to use a dephosphorization converter and a decarbonization converter to respectively perform dephosphorization and decarbonization, a dephosphorization furnace needs to be newly built, and a smelting time is longer than that of a single converter by more than 40 min, leading to disadvantages of large equipment investment and low production efficiency. Some enterprises use a converter double-slag method for deep dephosphorization. However, because it is not possible to completely discharge primary dephosphorization slag of a converter, a deep dephosphorization rate cannot be ensured, and it is very difficult to stably control a phosphorus content in molten steel below 0.01%.

Some enterprises use a triple-removal process (desilication, desulfuration, and dephosphorization) in molten iron pretreatment to perform dephosphorization. However, because a dephosphorization reaction is a reaction at a steel slag interface, a reaction formula is shown in the following Formula (1). A reaction resultant $P_2O_5$ of phosphorus and oxygen is very unstable. $P_2O_5$ needs to enter furnace slag to react with CaO to generate $CaO \cdot P_2O_5$ before it can be removed. A dephosphorization reaction occurs in only molten steel that is in contact with steel slag (nearly no dephosphorization reaction occurs in molten steel at a lower portion of a molten iron ladle). Therefore, long-time stirring is required to facilitate contact between steel slag and molten steel before P in the molten iron can be reduced to a required range (a P content in molten iron is below 0.03%). The molten iron pretreatment has low efficiency, and the entire triple-removal process needs to be performed for 150-200 min. As a result, the production efficiency is low, and molten iron has a large temperature drop, causing a severely adverse impact to the benefit of steel iron enterprises. Fewer and fewer steel iron enterprises in China use triple-removal to perform molten iron pretreatment. Therefore, it is necessary to improve a dephosphorization process, to achieve the objective of reducing a phosphorus content, and achieve the effect of improving low-temperature toughness.

$$2[P] + 5[O] + 4(CaO) = (4CaO \cdot P_2O_5) \qquad (1)$$

SUMMARY OF THE INVENTION

To meet the demand for high strength, high low-temperature toughness section steels in complex environments such as polar extremely-cold regions such as the North and South poles, a hot-rolled, low-temperature-resistant, H-shaped steel with a grade of yield strength up to 420 MPa and a preparation method therefor are designed and invented. The H-shaped steel meets the steel demand for the construction of architectural structures such as oil platforms in terrestrial and oceanic regions under extremely-low-temperature conditions, and at the same time has the advantage of low-cost preparation, thereby implementing lightweight architectural structures and facilitating steel structure architectures.

The technical solution of the present invention is as follows.

The present invention provides a low-temperature-resistant, H-shaped steel with a grade of yield strength of 420 MPa. The H-shaped steel includes the following chemical components in percentages by weight: C: 0.08-0.10%, Si≤0.2%, Mn: 1.25-1.45%, V: 0.03-0.045%, Ti: 0.015-0.025%, Cr: 0.15-0.30%, Als: 0.02-0.04%, N: 0.007-0.01%, P≤0.008%, S≤0.005%, O≤0.004%, and the balance being Fe and inevitable impurities.

Preferably, P and S in the present invention meet P+S≤0.01%. An H-shaped steel prepared meeting the requirement of the formula can better meet impact toughness requirements at polar temperatures. The invention is especially suitable for preparing medium and small-specification, H-shaped steel products with a flange thickness below 15 mm, but is not limited to products of the foregoing specifications.

The design principles of the chemical elements in the high-strength, hot-rolled, H-shaped steel in the present invention are as follows:

Carbon: To obtain a grade of strength of 420 MPa of a hot-rolled, H-shaped steel and meet a low-temperature-resistant performance requirement, a matrix structure of the steel is ultrathin lamellar pearlite and flat ferrite, and at the same time certain nanoscale vanadium-containing carbide is obtained. For a case that an H-shaped steel with a small specification has a large compression ratio, in combination with factors such as equipment capability and high difficulty of controlling end temperatures, a carbon content cannot be excessively high, and is controlled to be 0.08-0.10%.

Manganese: In a hot-rolled state steel, Mn can stabilize an austenite structure, increase the hardenability of the steel, and increase the strength of the steel. In addition, Mn is also an element that tends to segregate, and is not uniformly distributed at different positions in the structure of the steel, causing a large performance difference. To ensure strength, an Mn content is preferably set to 1.25% or more. In addition, to control fracture sensitivity, because excessive addition of Mn causes damage to mechanical performance indices such as low-temperature toughness and plasticity, Mn should not be excessively added. Therefore, after comprehensive consideration, the Mn content in the steel of the present invention is controlled to be 1.25-1.45%.

Silicon: Si is a deoxidation element, and helps to increase the strength. However, excessive Si forms a large amount of Si-containing $Fe_2SiO_4$Si on the surface of the steel to increase the viscosity of the steel, and oxidized iron scale is not easy to remove, affecting surface quality. A lower limit of the content is set below 0.20%.

Phosphorus: Phosphorus is a harmful impurity in a steel. Phosphorus can significantly expand a mushy zone between a liquid phase and a solid phase, and tends to segregate at grain boundaries. As a result, a local structure of the steel is abnormal, and steel products become "cold-short", which significantly reduces low-temperature impact toughness and temper brittleness of steel products, causing nonuniformity in mechanical performance. Phosphorus also causes corrosion fatigue and welding cracking. Therefore, a P content is appropriately controlled in converter smelting, which has a significant effect of increasing the low-temperature-resistant toughness of the H-shaped steel. In consideration of the equipment capability, in the present invention, P≤0.008%.

Sulfur: Sulfur is one of the five inevitable elements in a steel, and causes welding cracking and toughness reduction due to solidification segregation. Intermittent foreign impurities in a preparation process severely deteriorate the low-temperature toughness of the steel, and therefore contents of the impurities should be reduced as much as possible. Sulfur tends to form MnS inclusions, which becomes starting points of fractures to deteriorate machining performance. An S content is preferably restricted below 0.005%. Lower limit values of P and S depend on the equipment capability and cost control, and both exceed 0%, and P+S≤0.010%.

Aluminum: Al is used as a strong deoxidation element in a preparation process of the H-shaped steel of the present invention. To ensure that an oxygen content in the steel is as low as possible and reduce a probability that spherical inclusions are generated, some aluminum and nitrogen in the steel can further form an AlN precipitate, which can increase the strength of the steel. Therefore, an aluminum content in the present invention is controlled to 0.02-0.04%.

Titanium: Ti is an element that forms a strong carbide, and a trace amount of Ti helps to fix N in a steel. In addition, formed tiny TIN can inhibit austenite grains from growing excessively during heating of a steel blank, thereby achieving the objective of refining original austenite grains. Ti can also generate TiC, TiS, Ti4C2S2, and other compounds in the steel, and can also stop grains in a heat affected zone from growing during welding, which can also improve welding performance of a finished H-shaped steel. Therefore, it is selected to add Ti of 0.015-0.025% in the present invention.

Vanadium: As an element forming a strong carbonitride, a carbonitride of V forms a nanoscale carbonitride in a cooling phase in a later period of rolling to achieve a significant effect of precipitation strengthening. A VN alloy may be used as nucleation particles of ferrite and pearlite structures, which helps to refine the grains of the structures. VC also achieves an effect of precipitation strengthening. In addition, a vanadium-containing steel has low deformation resistance in rolling, and achieves an effect of reducing a rolling load. For a grade of yield strength of 420 MPa, a V content is controlled to 0.03-0.045%.

Chromium: The strength, hardness, and wear resistance of a steel can be increased by adding certain Cr to a steel. After chromium is added to the steel, the hardenability of the steel can be significantly increased. Experiments have proved that compared with Mo, Cr has weaker hardenability, and is unlikely to form a large amount of bainite structures at a low cooling rate to deteriorate the toughness of the steel. In addition, an excessively high or excessively low Cr content is not conducive to the hardenability and delayed fracture resistance of the steel, which tends to cause a defect. In consideration of avoiding the formation of an abnormal structure, Cr is controlled to 0.15-0.30%.

Nitrogen: N in a steel forms TiN with Ti, and at the same time forms VN with V. A VC alloy achieves an effect of precipitation strengthening, thereby increasing strength. An excessively high N content tends to induce a quality defect on a surface of a casting blank to generate transverse cracks, and the like. Therefore, a nitrogen content needs to be 0.007-0.010% in the present invention.

Oxygen: An oxygen content in a steel is appropriately reduced, so that oxygen can be prevented from forming large-particle oxide inclusions with elements with a strong oxidizing ability, thereby ensuring improved toughness and plasticity of the steel. An nitrogen content needs to be less than or equal to 0.004% in the present invention.

For the H-shaped steel, a yield strength ≥420 MPa, a tensile strength ≥520 MPa, an elongation ≥20%, and impact energy at −50° C.≥100 J.

The present invention further provides a preparation method for the foregoing H-shaped steel with a grade of yield strength of 420 MPa. The preparation method includes the following steps: molten iron pretreatment+deep dephosphorization→converter smelting→steel ladle argon blowing→RH/LF refining→rectangular continuous casting blank casting→slow cooling or hot delivery and charging in a continuous casting blank slow cooling pit→section steel line semi-continuous rolling→dense slow cooling in a cooling bed, and specifically includes the following steps:

(1) pretreatment and repeated dephosphorization of molten iron:

in a tapping process of a blast furnace, molten iron in the blast furnace flows into the first molten iron ladle, with continuous injection of the molten iron in the blast furnace, a dephosphorization agent is blown into the molten iron ladle to perform dephosphorization, a level in the molten iron ladle keeps rising, when a level of the molten iron exceeds an upper edge of a tapping hole by 20-30 cm, the tapping hole is opened, the molten iron flows into the second molten iron ladle through the tapping hole, blowing and dephosphorization operations are performed again in the second molten iron ladle, a tapping hole is also opened in a side of the second molten iron ladle at a position 20-30 cm below a steel slag interface of the molten iron ladle, molten iron dephosphorized at an upper portion of the second molten iron ladle flows downward into the third molten iron ladle through the tapping hole, this process is repeated, molten iron flows downward into an $N^{th}$ molten iron ladle through a tapping hole, an Nth dephosphorization operation is performed on the molten iron, and a phosphorus content in the molten iron is reduced below 0.02%, where 4≤N≤6; and every time dephosphorization is performed for 30 to 40 min, one slag exchange operation is performed on the first molten iron ladle to an $(N-1)^{th}$ molten iron ladle;

(2) converter smelting: a final phosphorus content is controlled below 0.007%; and (3) steel ladle argon blowing, RH/LF refining, rectangular continuous casting blank casting, slow cooling or hot delivery and charging in a continuous casting blank slow cooling pit, section steel line semi-continuous rolling, and dense slow cooling in a cooling bed are performed, where in a rolling process, a soaking temperature of a heating furnace is 1210-1250° C., and a casting blank in-furnace time is 140-180 min; and a finish initial rolling temperature is 1000-1050° C., and a finish final rolling temperature is 890-930° C.

Preferably, the first molten iron ladle to the $(N-1)^{th}$ molten iron ladle in step (1) have nominal capacities of 30-50 t molten iron and depths of 1.5-2 m, a tapping hole is opened in a sidewall of a molten iron ladle at a position 50-60 cm away from a top of the molten iron ladle, the tapping hole extends outward by 20-30 cm, a sliding plate is used to control opening and closing of the tapping hole, and a capacity of the Nth molten iron ladle matches an engineering tonnage of a converter.

Preferably, blowing points of the dephosphorization agent include an injection point of the molten iron in the blast furnace into the first molten iron ladle and an injection point of molten iron in an upper level of molten iron ladle into a lower level of molten iron ladle, that is, an injection point of molten iron in the first molten iron ladle into the second molten iron ladle, an injection point of molten iron in the second molten iron ladle into the third molten iron ladle, . . . , and an injection point of molten iron in an $(N-2)^{th}$ molten iron ladle into the $(N-1)^{th}$ molten iron ladle. Molten iron at this position is intensely stirred, and dephosphorization has a good dynamic condition.

Preferably, the dephosphorization agent is a mixture of sludge pellets and lime, a mass ratio of the sludge pellets to the lime is 1:1, the sludge pellets include the following components in percentages by mass: CaO: 2-8%, $Fe_2O_3$: 85-92%, and $SiO_2$: 1-5%, the lime includes the following components in percentages by mass: CaO: 85-90%, $Fe_2O_3$: 0-3%, $SiO_2$: 0-10%, and MgO: 0-10%, and an addition amount of the dephosphorization agent to the molten iron ladle is 2-3 kg/ton iron molten iron ladle.

Preferably, a carrier gas during the blowing of the dephosphorization agent is oxygen, a blowing pressure is 0.2-0.3 Mpa, and a blowing flow rate is 2-4 $m^3$/min.

Preferably, in the molten iron ladles, a position of a next molten iron ladle is lower than that of a previous molten iron ladle by 60-70 cm.

Preferably, the slag exchange operation is: furnace slag in the first molten iron ladle is poured out, furnace slag at a top of the second molten iron ladle is poured into the first molten iron ladle, and furnace slag at a top of the third molten iron ladle is poured into the second molten iron ladle, until furnace slag at a top of the $(N-1)^{th}$ molten iron ladle is poured into an $(N-2)^{th}$ molten iron ladle.

Preferably, a slag tap is opened in the top of each of the first molten iron ladle to the $(N-1)^{th}$ molten iron ladle, the slag tap extends outward by 20-30 mm, and a position difference between the slag tap and the tapping hole in a ladle wall of the molten iron ladle is one fourth of a circumference; and a hydraulic elevation apparatus and a rotation apparatus are configured in a ladle car of each of the first molten iron ladle to the $(N-1)^{th}$ molten iron ladle, the molten iron ladle is elevated by 1-2 m, and the molten iron ladle is rotatable around a central axis by 90 degrees. In a rolling process, rolling includes rough rolling and finish rolling, and the rough rolling uses reciprocal rolling of generally 7 passes. The finish rolling uses continuous rolling of 5 passes, and water cools in a fine rolling mill frame are all turned on. To ensure control of a final rolling temperature, compression ratios in the last two passes of finish rolling are 6-12%. Sufficient cooling after the finish rolling facilitates precipitation of a carbonitride of V to produce an effect of precipitation strengthening.

In the present invention, through a design of low-carbon low-phosphorus vanadium-containing micro-alloying process, in combination with a section steel groove rolling, industrial production of medium and small-specification, high-strength, high roughness, H-shaped steel products with a grade of 420 MPa is implemented.

Dephosphorization Process:

In the tapping process of the blast furnace, multi-level blowing and dephosphorization treatment is performed on molten iron. Blowing and dephosphorization treatment is performed on molten iron in the molten iron ladles. Through the use of characteristics that molten iron at a steel slag interface has a good dephosphorization dynamic condition and dephosphorization is sufficient, a tapping hole is opened in a side at a position 20-30 cm below a molten iron ladle steel slag interface. Molten iron that is sufficiently dephosphorized at an upper portion of the molten iron ladle flows into a lower level of molten iron ladle through the tapping hole. Blowing and dephosphorization operations are performed again in the lower level of molten iron ladle, and a tapping hole is also opened in a side at a position 20-30 cm below a steel slag interface of the lower level of molten iron ladle. Molten iron that is sufficiently dephosphorized at an upper portion of the lower level of molten iron ladle can continue to flow into a further lower level of molten iron ladle through the tapping hole. This process is repeated to perform 4-6 dephosphorization operations on molten iron. An example of performing 4 times of dephosphorization on molten iron is specifically used to describe a molten iron dephosphorization process below. Because furnace slag in an upper level of molten iron ladle cannot flow into a lower level of molten iron ladle and only molten iron flows into the lower level of molten iron ladle, a dephosphorization equilibrium reaction occurs again between phosphorus in the molten iron in the lower level of molten iron ladle and furnace slag, and the phosphorus in molten iron is further removed. After repeated dephosphorization treatment, the phosphorus in the molten iron is reduced to an extremely low value.

A specific implementation process of the dephosphorization method is as follows:

Step (1): In the tapping process of the blast furnace, the molten iron in the blast furnace flows into the first molten iron ladle, the first molten iron ladle has a nominal capacity of 30-50 t molten iron and a depth of 1.5-2 m, a tapping hole is opened in a sidewall of a molten iron ladle at a position 50-60 cm away from a top of the molten iron ladle, the tapping hole extends outward by 20-30 cm, and a sliding plate is used to control opening and closing of the tapping hole. With the continuous injection of the molten iron in the blast furnace, when a volume of the molten iron in the first molten iron ladle exceeds 50%, the dephosphorization agent is blown into the molten iron ladle to perform dephosphorization. In this case, the tapping hole is in a closed state. A level in the molten iron ladle keeps rising. When a level of the molten iron exceeds an upper edge of the tapping hole by 20-30 cm, the tapping hole is opened, and the molten iron flows into the second molten iron ladle through the tapping hole. A flow rate at which the molten iron flows from the first molten iron ladle into the second molten iron ladle is the same as a flow rate at which the molten iron in the blast furnace flows into the first molten iron ladle. The level of the molten iron is a stable state of neither rising nor dropping. A dephosphorization reaction occurs continuously at a steel slag interface of the first molten iron ladle. Phosphorus in molten iron near the steel slag interface is continuously removed. Molten iron that is sufficiently dephosphorized at an upper portion of the first molten iron ladle flows into the second molten iron ladle through the tapping hole.

A position of the second molten iron ladle is lower than that of the first molten iron ladle by 60-70 cm, and the molten iron flows from the first molten iron ladle into the second molten iron ladle through the tapping hole under the action of gravity.

Step (2): Molten iron ladle size parameters and dephosphorization process parameters of the second molten iron ladle, the third molten iron ladle, and the fourth molten iron ladle are identical with those of the first molten iron ladle, and blowing and dephosphorization operations are performed in all the second, third, and fourth molten iron ladles.

Molten iron that is sufficiently dephosphorized near a steel slag interface of the second molten iron ladle flows into the third molten iron ladle through a tapping hole under the action of gravity, and molten iron that is sufficiently dephosphorized near a steel slag interface of the third molten iron ladle flows into the fourth molten iron ladle through a tapping hole under the action of gravity. Molten iron that is sufficiently dephosphorized near a steel slag interface of the fourth molten iron ladle flows into the fifth molten iron ladle through a tapping hole under the action of gravity.

Positions of the third molten iron ladle, the fourth molten iron ladle, and the fifth molten iron ladle are respectively lower than those of the second molten iron ladle, the third molten iron ladle, and the fourth molten iron ladle by 60-70 cm.

The fifth molten iron ladle is a large-volume molten iron ladle. A capacity of the fifth molten iron ladle matches an engineering tonnage of a converter. The molten iron in the fifth molten iron ladle is transported into a KR working position for desulfuration. After the desulfuration is completed, the molten iron is transported into the converter to perform normal smelting. A final phosphorus content of converter smelting is controlled below 0.007%.

Preferably, every time normal dephosphorization is performed for 30 to 40 min, one slag exchange operation is performed on the first to fourth molten iron ladles. A slag exchange process of the molten iron ladles is: furnace slag in the first molten iron ladle is poured out, furnace slag at a top of the second molten iron ladle is poured into the first molten iron ladle, furnace slag at a top of the third molten iron ladle is poured into the second molten iron ladle, and furnace slag at a top of the fourth molten iron ladle is poured into the third molten iron ladle. Because a multi-level dephosphorization process is used, a phosphorus content in the lower level of molten iron ladle is lower than that in the upper level of molten iron ladle. Under a process condition of sufficient dephosphorization, a distribution ratio of phosphorus in slag iron basically remains unchanged. That is, the phosphorus content in slag in a lower level of steel ladle is also lower than that in an upper level of steel ladle. Therefore, after furnace slag at a top of a lower level of molten iron ladle is poured into an upper level of molten iron ladle, furnace slag can still produce a good dephosphorization effect.

Preferably, a slag tap is opened in the top of each of the first to fourth molten iron ladles, the slag tap extends outward by 20-30 mm, furnace slag in a molten iron ladle can flow out through the slag tap, and a position difference between the slag tap and the tapping hole in a ladle wall of the molten iron ladle is one fourth of a circumference.

Preferably, a hydraulic elevation apparatus and a rotation apparatus are configured in a ladle car of each of the first to fourth molten iron ladles, the molten iron ladle may be elevated by 1-2 m, and the molten iron ladle is rotatable around a central axis by 90 degrees.

Preferably, during the slag exchange operation, the tapping hole is first closed, and then the rotation apparatuses on the ladle cars of the molten iron ladles are used to make the upper level of molten iron ladle and the lower level of molten iron ladle rotate around the central axis by 90 degrees, to avoid contacting the tapping hole during elevation of the steel ladles. Then the hydraulic elevation apparatuses are used to lower the upper level of molten iron ladle and elevate the lower level of molten iron ladle. When the lower level of molten iron ladle is higher than the upper level of molten iron ladle and furnace slag in the lower level of molten iron ladle can flow into the upper level of molten iron ladle through the slag tap, the slag tap is opened, so that the furnace slag flows from the lower level of molten iron ladle into the upper level of molten iron ladle. After the furnace slag has flowed completely, the slag tap is closed.

For working procedures that are not mentioned in the present invention, existing technologies may be used.

The advantages of the technical solutions of the present invention are as follows.

1. In the present invention, the characteristic of the flange of the small-specification H-shaped steel being thin in rectangular blank rolling is combined, the design of a low C content suitable for normalizing rolling being in cooperation with a V micro-alloyed component is used, an appropriate amount of Cr is added to control the cooling rate, and the situation whereby the low-temperature impact toughness of steel deteriorates due to the occurrence of abnormal structures such as widmanstatten is avoided, thus a stably controlled, high-strength and high-toughness, hot-rolled, H-shaped steel with a grade of 420 MPa or more is obtained on a hot-rolled H-shaped steel rolling mill.

2. In the present invention, a low phosphorus smelting process is used. A P content is controlled below 0.008%, and in addition, a P+S content is lower than 0.011%, which helps to increase low-temperature-resistant toughness of steel and still keep the toughness at a high level under a condition of −50° C.

3. A matrix structure of the H-shaped steel of the present invention is refined pearlite+proeutectoid ferrite. Second-phase particles are mainly V (C, N). The steel has better structural stability, and can be obtained more easily.

4. In the present invention, fine grain strengthening and precipitation strengthening are implemented by refining the matrix structure, thereby achieving a good effect that the H-shaped steel has obtained low-temperature impact toughness greater than 100 J under −50° C. condition on the basis of 420 MPa.

5. In the present invention, in a tapping process of a blast furnace, four to six blowing and dephosphorization operations are performed on molten iron through four to six small-scale molten iron ladles. The dephosphorization operations are continuous operations, and the production efficiency is high. A total dephosphorization time is a flowing and circulation time of molten iron in the four to six small molten iron ladles, and is only 20-30 min, which is much shorter than a time of triple-removal treatment, and the dephosphorization efficiency is high.

6. In the present invention, a tapping hole in a small-scale molten iron ladle is located near a steel slag interface of the molten iron ladle. A dephosphorization dynamic condition at this position is good, and a dephosphorization reaction at the steel slag interface is sufficient. Therefore, molten iron that is sufficiently dephosphorized flows into a lower level of molten iron ladle. Molten iron that has not undergone a dephosphorization reaction at a bottom of the molten iron ladle rises near the steel slag interface, and a dephosphorization reaction continues to occur. Such a dephosphorization manner has high dephosphorization efficiency.

7. In the present invention, a phosphorus enrichment of furnace slag in a lower level of molten iron ladle is lower than a phosphorus enrichment of furnace slag in an upper level of molten iron ladle. Therefore, molten iron that flows into the lower level of molten iron ladle can continue to undergo a dephosphorization reaction with furnace slag. This is equivalent to that a slag exchange-type dephosphorization operation. After four to six slag exchange-type dephosphorization operations, a phosphorus content in molten iron can be reduced below 0.02%. A dephosphorization rate of molten iron is high, which facilitates stable production of a low-phosphorus steel.

8. In the present invention, a phosphorus enrichment in furnace slag of a lower level of molten iron ladle is lower than a phosphorus enrichment in furnace slag of an upper level of molten iron ladle. Therefore, after the furnace slag in the lower level of molten iron ladle flows into the upper level of molten iron ladle, a dephosphorization effect can still be produced, which is equivalent to that dephosphorization slag is recycled, so that the consumption of dephosphorization materials is reduced, and dephosphorization costs are reduced.

Figure 1:
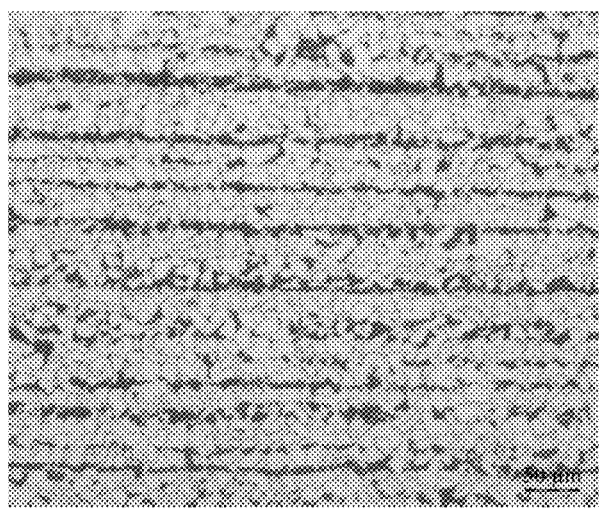
FIG. 1 is an image of a metallurgical structure (×200) of a high-toughness, low-temperature-resistant, H-shaped steel with a grade of yield strength of 420 MPa prepared in Example 2 of the present invention.

REFERENCE NUMERALS 1. blast furnace, 2. first molten iron ladle, 3. second molten iron ladle, 4. third molten iron ladle, 5. fourth molten iron ladle, 6. fifth molten iron ladle, 7. powder injection desulfuration apparatus, 8. tapping hole, and 9. slag tap.

DETAILED DESCRIPTION

The present invention is described below by using specific embodiments. It needs to be pointed out that the embodiments are only used to further describe the present invention, but are not used to limit the scope of protection of the present invention. Nonessential changes and adjustments made by others according to the present invention still belong to the scope of protection of the present invention.

Figure 2:
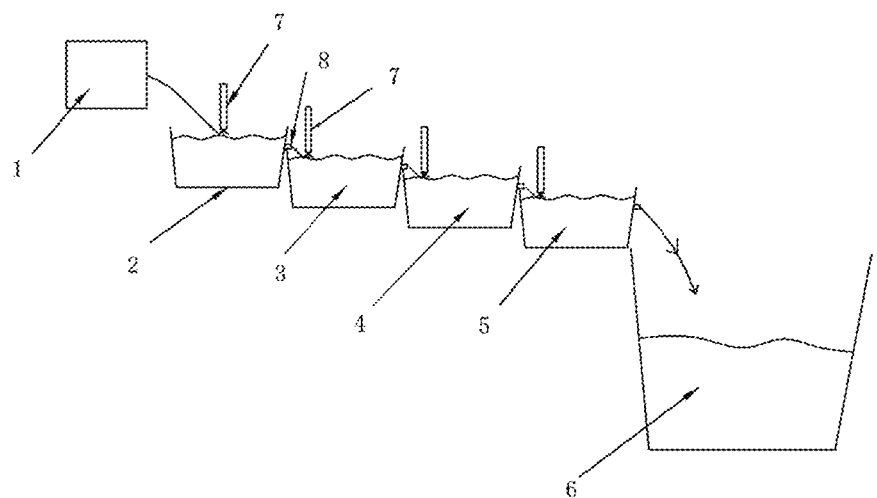
FIG. 2 is a schematic diagram of multi-level dephosphorization according to the present application.
Figure 3:
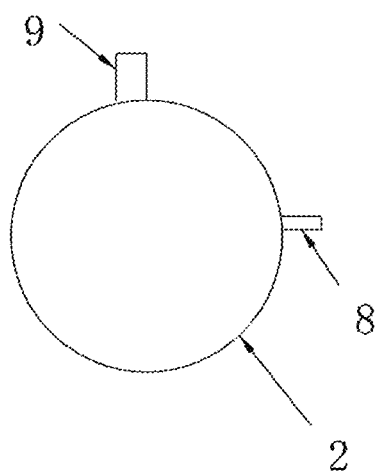
FIG. 3 is a schematic structural diagram of a small-scale molten iron ladle.
Figure 4:
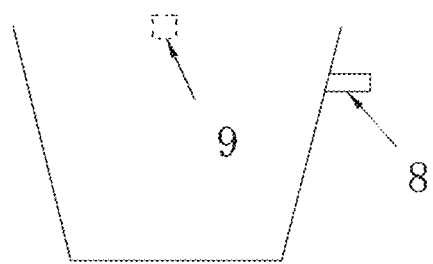
FIG. 4 is a schematic structural side view of a small-scale molten iron ladle.

Continuous casting blanks in the following embodiments are all prepared according to the following process procedure: According to set ranges of chemical components (Table 1), molten iron in a blast furnace are used as raw materials. Through dephosphorization, KR dephosphorization, converter smelting, and refining in a tapping process of the blast furnace, contents of C, Si, Mn, S, P, and the like are adjusted and micro-alloyed. Continuous casting and direct heating or soaking of casting blanks are performed after the contents of the components reach target values. Preparation steps in Examples 1~4 are as follows:

The steel undergoes dephosphorization and KR molten iron pretreatment and desulfuration→converter smelting-→steel ladle argon blowing→refining→continuous casting-→haped steel line rolling→online cooling→slow cooling in a cooling bed in the tapping process of the blast furnace. Section steel line rolling includes two phases of rolling: rough rolling and finish rolling. Priority is given to temperature control in a hot-rolling working procedure, an outer side of a flange is detected for a final rolling temperature, and a rolled rolling steel is naturally cooled in a cooling bed. Chemical components and specific processes in Examples 1-4 are shown in Table 1 below.

control opening and closing of the tapping hole. With the continuous injection of the molten iron in the blast furnace, when a volume of the molten iron in the first molten iron ladle exceeds 50%, the dephosphorization agent is blown into the molten iron ladle to perform dephosphorization. In this case, the tapping hole is in a closed state. A level in the molten iron ladle keeps rising. When a level of the molten iron exceeds an upper edge of the tapping hole by 20 cm, the tapping hole is opened, and the molten iron flows into the second molten iron ladle through the tapping hole. A flow rate at which the molten iron flows from the first molten iron ladle into the second molten iron ladle is the same as a flow rate at which the molten iron in the blast furnace flows into the first molten iron ladle. The level of the molten iron is a stable state of neither rising nor dropping. A dephosphorization reaction occurs continuously at a steel slag interface of the first molten iron ladle. Phosphorus in molten iron near the steel slag interface is continuously removed. first molten iron ladle the upper portion Molten iron that is sufficiently dephosphorized flows into the second molten iron ladle through the tapping hole, as shown in FIGS. 2-4.

Blowing points of the dephosphorization agent include an injection point of the molten iron in the blast furnace into the first molten iron ladle and an injection point of molten iron in an upper level of molten iron ladle into a lower level of molten iron ladle. Molten iron at this position is intensely stirred, and dephosphorization has a good dynamic condition.

The dephosphorization agent is a mixture of sludge pellets and lime, an addition amount of the dephosphorization agent to the first molten iron ladle is 2 kg/ton iron molten iron ladle, a mass ratio of the sludge pellets to the lime is 1:1, the sludge pellets include the following components in percentages by mass: CaO: 5%, $Fe_2O_3$: 88%, and $SiO_2$: 3%, and the balance being impurities. The lime includes the following components in percentages by mass: CaO: 90%, $Fe_2O_3$: 1%, $SiO_2$: 3%, and MgO: 5%, and the balance being impurities.

A carrier gas during the blowing of the dephosphorization agent is oxygen, a blowing pressure is 0.2 Mpa, and a blowing flow rate is 2 $m^3$/min.

A position of the second molten iron ladle is lower than that of the first molten iron ladle by 60 cm, and the molten iron flows from the first molten iron ladle into the second molten iron ladle through the tapping hole under the action of gravity.

TABLE 1

| | Chemical components (wt %, the balance being iron) | | | | | | | | | |
|---|---|---|---|---|---|---|---|---|---|---|
| Item | C | Si | Mn | P | S | Cr | V | Ti | Al | N |
| Example 1 | 0.08 | 0.15 | 1.30 | 0.007 | 0.002 | 0.28 | 0.03 | 0.015 | 0.025 | 0.008 |
| Example 2 | 0.09 | 0.20 | 1.45 | 0.006 | 0.003 | 0.30 | 0.03 | 0.025 | 0.026 | 0.009 |
| Example 3 | 0.08 | 0.20 | 1.28 | 0.006 | 0.004 | 0.25 | 0.04 | 0.018 | 0.03 | 0.008 |
| Example 4 | 0.10 | 0.15 | 1.39 | 0.005 | 0.003 | 0.30 | 0.035 | 0.019 | 0.033 | 0.01 |

A specific dephosphorization process in the tapping process of the blast furnace is as follows:

Step (1): In the tapping process of the blast furnace, the molten iron in the blast furnace flows into the first molten iron ladle, the first molten iron ladle has a nominal capacity of 30 t molten iron and a depth of 1.5 m, a tapping hole is opened in a sidewall of a molten iron ladle at a position 50 cm away from a top of the molten iron ladle, the tapping hole extends outward by 20 cm, and a sliding plate is used to Step (2): Molten iron ladle size parameters and dephosphorization process parameters of the second molten iron ladle, the third molten iron ladle, and the fourth molten iron ladle are identical with those of the first molten iron ladle, and blowing and dephosphorization operations are performed in all the second, third, and fourth molten iron ladles.

Molten iron that is sufficiently dephosphorized near a steel slag interface of the second molten iron ladle flows into the third molten iron ladle through a tapping hole under the action of gravity, and molten iron that is sufficiently dephosphorized near a steel slag interface of the third molten iron ladle flows into the fourth molten iron ladle through a tapping hole under the action of gravity. Molten iron that is sufficiently dephosphorized near a steel slag interface of the fourth molten iron ladle flows into the fifth molten iron ladle through a tapping hole under the action of gravity.

Positions of the third molten iron ladle, the fourth molten iron ladle, and the fifth molten iron ladle are respectively lower than those of the second molten iron ladle, the third molten iron ladle, and the fourth molten iron ladle by 60 cm.

Components and temperatures of molten iron are detected. Dephosphorization rates and temperatures of molten iron in four small-scale molten iron ladles are shown in the following table:

TABLE 2

Dephosphorization rates and temperatures of molten iron in molten iron ladles

|  | Molten iron in the blast furnace | First molten iron ladle | Second molten iron ladle | Third molten iron ladle | Fourth molten iron ladle | Fifth molten iron ladle |
| --- | --- | --- | --- | --- | --- | --- |
| Phosphorus content (% in molten iron | 0.163 | 0.116 | 0.069 | 0.035 | 0.018 | 0.017 |
| Molten iron temperature (° C.) | 1520 | 1483 | 1471 | 1454 | 1437 | 1426 |

As can be seen from the foregoing table, after dephosphorization in the four small-scale molten iron ladles, the phosphorus content in the molten iron is reduced from 0.163% to 0.017%, a dephosphorization rate of the molten iron is 89.6%, and the dephosphorization rate of the molten iron is high. The temperature of the molten iron is reduced from 1520° C. to 1426° C., a temperature drop of the molten iron is 94° C., and the temperature drop of the molten iron is small. The temperature of the molten iron after dephosphorization is much higher than a temperature requirement for entering a converter (higher than 1250° C.).

The fifth molten iron ladle is a large-volume molten iron ladle. A capacity of the fifth molten iron ladle matches an engineering tonnage of a converter. The molten iron in the fifth molten iron ladle is transported into a KR working position for desulfuration. After the desulfuration is completed, the molten iron is transported into the converter to perform normal smelting. A final phosphorus content of converter smelting is controlled below 0.007%.

Every time normal dephosphorization is performed for 30 to 40 min, one slag exchange operation is performed on the first to fourth molten iron ladles. A slag exchange process of the molten iron ladles is: furnace slag in the first molten iron ladle is poured out, furnace slag at a top of the second molten iron ladle is poured into the first molten iron ladle, furnace slag at a top of the third molten iron ladle is poured into the second molten iron ladle, and furnace slag at a top of the fourth molten iron ladle is poured into the third molten iron ladle. Because a multi-level dephosphorization process is used, a phosphorus content in the lower level of molten iron ladle is lower than that in the upper level of molten iron ladle. Under a process condition of sufficient dephosphorization, a distribution ratio of phosphorus in slag iron basically remains unchanged. That is, the phosphorus content in slag in a lower level of steel ladle is also lower than that in an upper level of steel ladle. Component detection is performed on furnace slag in the molten iron ladles. Components of furnace slag in the four small-scale molten iron ladles are shown in the following table.

TABLE 3

Components of furnace slag in molten iron ladles

|  | Furnace slag in the blast furnace | First molten iron ladle | Second molten iron ladle | Third molten iron ladle | Fourth molten iron ladle |
| --- | --- | --- | --- | --- | --- |
| CaO (%) | 41 | 37 | 43 | 45 | 45 |
| SiO$_2$ (%) | 35 | 31 | 30 | 29 | 31 |
| Al$_2$O$_3$ (%) | 14 | 11 | 7 | 5 | 5 |

TABLE 3-continued

Components of furnace slag in molten iron ladles

|  | Furnace slag in the blast furnace | First molten iron ladle | Second molten iron ladle | Third molten iron ladle | Fourth molten iron ladle |
| --- | --- | --- | --- | --- | --- |
| MgO (%) | 6 | 5 | 5 | 6 | 5 |
| S (%) | 0.9 | 0.1 | 0.2 | 0.1 | 0.1 |
| P$_2$O$_5$ (%) | 0.13 | 0.91 | 0.64 | 0.47 | 0.30 |
| T. Fe (total iron) (%) | 0.3 | 8 | 11 | 13 | 14 |

As can be seen from the foregoing table, a phosphorus content in furnace slag in a lower level of steel ladle is lower than a phosphorus content in furnace slag in an upper level of steel ladle. The furnace slag in the lower level of steel ladle has higher basicity and a stronger oxidizing ability (T.Fe may be converted into FeO). Therefore, after furnace slag at a top of the lower level of molten iron ladle is poured into the upper level of molten iron ladle, the furnace slag can still produce a good dephosphorization effect.

A slag tap is opened in the top of each of the first to fourth molten iron ladles, the slag tap extends outward by 20 mm, furnace slag in a molten iron ladle can flow out through the slag tap, and a position difference between the slag tap and the tapping hole in a ladle wall of the molten iron ladle is one fourth of a circumference.

A hydraulic elevation apparatus and a rotation apparatus are configured in a ladle car of each of the first molten iron ladle to the fourth molten iron ladle, the molten iron ladle may be elevated by 1.5 m, and the molten iron ladle is rotatable around a central axis by 90 degrees.

During the slag exchange operation, the tapping hole is first closed, and then the rotation apparatuses on the ladle cars of the molten iron ladles are used to make the upper level of molten iron ladle and the lower level of molten iron ladle rotate around the central axis by 90 degrees, to avoid contacting the tapping hole during elevation of the steel ladles. Then the hydraulic elevation apparatuses are used to lower the upper level of molten iron ladle and elevate the lower level of molten iron ladle. When the lower level of molten iron ladle is higher than the upper level of molten iron ladle and furnace slag in the lower level of molten iron ladle can flow into the upper level of molten iron ladle through the slag tap, the slag tap is opened, so that the furnace slag flows from the lower level of molten iron ladle into the upper level of molten iron ladle. After the furnace slag has flowed completely, the slag tap is closed.

Hot-rolling process conditions in Examples 1-4 are shown in Table 2. The used standard is BS EN ISO 377-1997 *Location and preparation of samples and test pieces for mechanical testing*. For experimental methods of a yield strength, a tensile strength, and an elongation, refer to the standard ISO6892-1-2009 *Metallic materials—Tensile testing—Method of test at room temperature*. For an impact energy experiment method, refer to the standard ISO 148-1 *Metallic materials—Charpy pendulum impact test*. Results are shown in Table 3.

TABLE 4

Hot-rolling process in examples

| Item | Heating temperature (° C.) | Holding time (min) | Final rolling temperature (° C.) | Flange thickness t mm |
| --- | --- | --- | --- | --- |
| Example 1 | 1230 | 140 | 930 | 15 |
| Example 2 | 1220 | 145 | 910 | 12.7 |
| Example 3 | 1210 | 170 | 900 | 11 |
| Example 4 | 1230 | 160 | 880 | 10 |

TABLE 5

Mechanical performance experiment results in examples

| Item | Yield strength (MPa) | Tensile strength (MPa) | Elongation (%) | −50° C. Akv (J) |
| --- | --- | --- | --- | --- |
| Example 1 | 440 | 560 | 25 | 180 |
| Example 2 | 445 | 600 | 20 | 190 |
| Example 3 | 450 | 580 | 22 | 205 |
| Example 4 | 455 | 590 | 26 | 220 |

As can be seen from the table, yield strengths in Examples 1-4 in the present invention are kept at a 440 MPa grade. The steels have good extensibility, and have high impact energy at −50° C. The steels can meet use conditions of preparing ocean engineering members in extremely low-temperature environment, and are suitable for manufacturing support structure members such as ocean oil platforms and ocean transport ships that have high low-temperature toughness requirements.

As can be seen from FIG. 1, the structure in the present application is a granular bainite+ferrite structure. When a P content is reduced, for an H-shaped steel with a grade of strength of 420 MPa, while the strength is met, and the toughness, especially low-temperature toughness, is improved. Conventional technical knowledge in the field may be used for content that is not described in detail in the present invention.

Finally, it should be noted that the foregoing embodiments are merely intended for describing the technical solutions of the present invention rather than limiting the present invention. Although the present invention is described in detail with reference to the embodiments, persons of ordinary skill in the art should understand that they may still make modifications or equivalent replacements to the technical features of the present invention without departing from the spirit and scope of the technical solutions of the technical solutions of the present invention. These modifications or equivalent replacements shall all fall within the scope of the claims the present invention.

The invention claimed is:

1. A low-temperature-resistant, H-shaped steel with a grade of yield strength of 420 MPa, wherein the H-shaped steel comprises the following chemical components in percentages by weight: C: 0.08-0.10%, Si≤0.2%, Mn: 1.25-1.45%, V: 0.03-0.045%, Ti: 0.015-0.025%, Cr: 0.15-0.30%, Al: 0.02-0.04%, N: 0.007-0.01%, P≤0.008%, S≤0.005%, P+S≤0.01%, O≤0.004%, and the balance being Fe and inevitable impurities, and wherein the impact energy of the H-shaped steel at −50° C.≥100 J.

* * * * *